US012698033B2

(12) United States Patent (10) Patent No.: US 12,698,033 B2
Park (45) Date of Patent: Aug. 4, 2026

(54) METHOD OF CONTROLLING FINE STEERING OF INDEPENDENT STEERING APPARATUSES

(71) Applicants: HYUNDAI MOTOR COMPANY, Seoul (KR); KIA CORPORATION, Seoul (KR)

(72) Inventor: Jeong Hwan Park, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 353 days.

(21) Appl. No.: 18/594,614

(22) Filed: Mar. 4, 2024

(65) Prior Publication Data

US 2025/0065949 A1 Feb. 27, 2025

(30) Foreign Application Priority Data

Aug. 22, 2023 (KR) ........................ 10-2023-0109875

(51) Int. Cl.
B62D 7/15 (2006.01)
(52) U.S. Cl.
CPC ........... B62D 7/159 (2013.01); B62D 7/1509 (2013.01)

(58) Field of Classification Search
CPC ......... B62D 7/159; B62D 7/1509; B62D 7/15
See application file for complete search history.

(56) References Cited

U.S. PATENT DOCUMENTS

2016/0167698 A1* 6/2016 Ooba ..................... B62D 3/126
280/93.512

FOREIGN PATENT DOCUMENTS

KR 20070103191 A 10/2007

* cited by examiner

*Primary Examiner* — Jacob M Amick
(74) *Attorney, Agent, or Firm* — Lempia Summerfield Katz LLC

(57) ABSTRACT

A method of controlling fine steering of independent steering apparatuses of a vehicle includes determining, by a controller, a parallel mode input; performing rotation of the independent steering apparatuses when the controller receives the parallel mode input, and determining, by the controller, a moving direction of the vehicle in response to a rotating direction of a steering wheel. The method further includes: after determining the moving direction of the vehicle, determining, by the controller, whether or not the vehicle enters a fine steering mode; and performing, by the controller, steering angle input to the independent steering apparatuses located at a front end in the moving direction of the vehicle.

14 Claims, 4 Drawing Sheets

[ PARALLEL MODE ]

FIG. 3

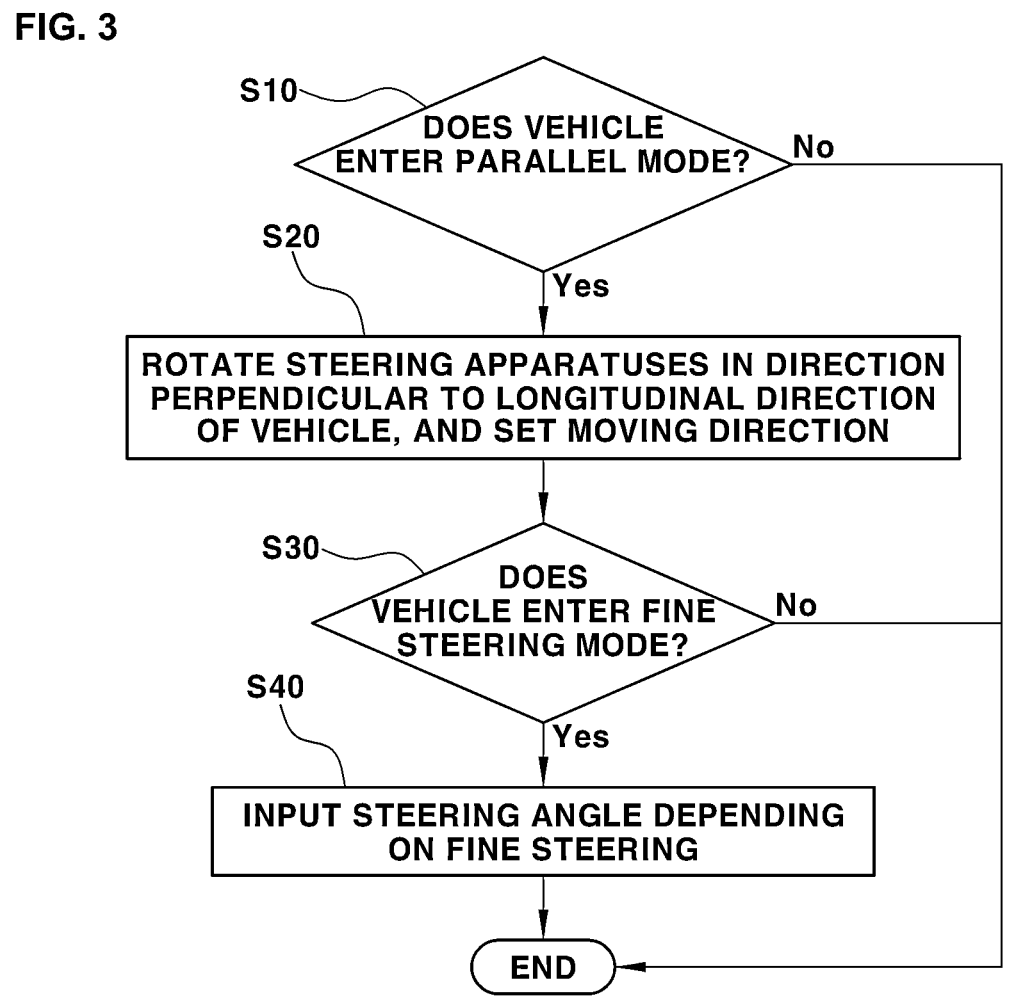

S10 — DOES VEHICLE ENTER PARALLEL MODE? — No

Yes

S20 — ROTATE STEERING APPARATUSES IN DIRECTION PERPENDICULAR TO LONGITUDINAL DIRECTION OF VEHICLE, AND SET MOVING DIRECTION

S30 — DOES VEHICLE ENTER FINE STEERING MODE? — No

Yes

S40 — INPUT STEERING ANGLE DEPENDING ON FINE STEERING

END

1

METHOD OF CONTROLLING FINE STEERING OF INDEPENDENT STEERING APPARATUSES

CROSS-REFERENCE TO RELATED APPLICATION

This application claims under 35 U.S.C. § 119(a) the benefit of and priority to Korean Patent Application No. 10-2023-0109875, filed on Aug. 22, 2023, the entire contents of which are incorporated herein by reference.

BACKGROUND

(a) Technical Field

The present disclosure relates to a method of controlling fine steering of independent steering apparatuses. More particularly, it relates to a method of controlling fine steering of independent steering apparatuses respectively coupled to the body of a vehicle and independently controlled when driving the independent steering apparatuses in a parallel mode.

(b) Background Art

A conventional steering apparatus for vehicles includes a pitman arm mounted on the output shaft of a steering gear and rotated, a drag link configured to transmit motion of the pitman arm to knuckle arms, the knuckle arms configured to receive motion of the drag link and to operate knuckle spindles, and a tie rod configured to connect the left and right knuckle arms.

With this configuration, a steering angle is input to knuckles coupled to the front wheels of the vehicle by rotating the output shaft of the steering gear in response to input to a steering wheel, thereby providing a vehicle turning environment.

Recently, there has been a development of independent steering apparatuses, each of which performs input of a steering angle to a corresponding wheel of a vehicle through each suspension apparatus or a motor assembly coupled to a vehicle body, and each corner module may be modularized and coupled to a vehicle body frame of the vehicle.

Each of the independent steering apparatuses coupled to the vehicle body may be controlled so as to perform parallel movement based on the longitudinal direction of the vehicle body.

However, even when the vehicle body is moved in the parallel direction through the independent steering apparatuses in a parallel mode, fine steering for adjusting a movement space and the moving direction of the vehicle body is essentially required.

The above information disclosed in this Background section is provided only to enhance understanding of the background of the present disclosure and therefore it may contain information that does not form the prior art that is already known to a person of ordinary skill in the art.

SUMMARY OF THE DISCLOSURE

The present disclosure has been made in an effort to solve the above-described problems associated with the prior art. The present disclosure provides a method of controlling fine steering of independent steering apparatuses of a vehicle such that the independent steering apparatuses may be finely steered when the vehicle is driven in a parallel mode.

The present disclosure also provides a method of controlling fine steering of independent steering apparatuses based on an input value to a steering wheel, whether or not the input value is a value corresponding to a simple parallel mode or a fine steering input, and a user request.

In one embodiment of the present disclosure, a method of controlling fine steering of independent steering apparatuses for a vehicle includes: determining, by a controller, a parallel mode input; performing rotation of the independent steering apparatuses when the controller receives the parallel mode input; and determining, by the controller, a moving direction of the vehicle in response to a rotating direction of a steering wheel. The method further includes: after setting the moving direction of the vehicle, determining, by the controller, whether or not the vehicle enters a fine steering mode; and performing, by the controller, steering angle input to the independent steering apparatuses located at a front end in the moving direction of the vehicle.

In an embodiment, determining the moving direction of the vehicle in response to the rotating direction of the steering wheel may include determining, by the controller, whether a rotation angle equal to or greater than a first set angle is applied to the steering wheel.

In another embodiment, determining whether the vehicle enters to the fine steering mode after setting the moving direction of the vehicle may include: determining whether the steering wheel returns to a second set angle or less after the rotation angle equal to or greater than the first set angle is applied to the steering wheel; and determining that the vehicle enters the fine steering mode, when an additional steering input is applied to the steering wheel after the steering wheel returns to the second set angle or less.

In still another embodiment, the independent apparatuses may maintain a parallel mode, upon determining that the steering wheel does not return to the second set angle or less after the rotation angle equal to or greater than the first set angle is applied to the steering wheel.

In yet another embodiment, the independent apparatuses may maintain a parallel mode, upon determining that the additional steering input is not applied to the steering wheel after the steering wheel returns to the second set angle or less.

In still yet another embodiment, determining that the vehicle enters the fine steering mode may include performing fine steering of at least one independent steering apparatus, among the independent steering apparatuses, located at one end facing the moving direction in response to additional input to the steering wheel.

In a further embodiment, in performing the rotation of the independent steering apparatuses when the controller receives the parallel mode input, the controller may control the independent steering apparatuses to have a steering angle corresponding to a direction perpendicular to a longitudinal direction of the vehicle.

In another aspect of the present disclosure, a method of controlling fine steering of independent steering apparatuses of a vehicle includes: determining, by a controller, a parallel mode input; performing rotation of the independent steering apparatuses when the controller receives the parallel mode input; determining, by the controller, a moving direction of the vehicle in response to a rotating direction of a steering wheel of the vehicle; and after setting the moving direction of the vehicle, determining, by the controller, whether or not the vehicle enters a fine steering mode. The method further includes: determining, by the controller, whether or not additional input is applied to the steering wheel upon determining that the vehicle enters the fine steering mode;

and after the entry of the vehicle to the fine steering mode, performing, by the controller, steering angle input to the independent steering apparatuses located at a front end in the moving direction of the vehicle in response to the additional input to the independent steering wheel.

In an embodiment, determining the moving direction of the vehicle in response to the rotating direction of the steering wheel may include: determining, by the controller, whether or not a rotation angle equal to or greater than a first set angle is applied to the steering wheel.

In another embodiment, determining whether or not the vehicle enters to the fine steering mode, after setting the moving direction of the vehicle may include: after the rotation angle equal to or greater than the first set angle is applied to the steering wheel, determining whether or not the steering wheel returns to a second set angle or less; and when an additional steering input is applied to the steering wheel after the steering wheel returns to the second set angle or less, determining that the vehicle enters the fine steering mode.

In still another embodiment, the independent apparatuses may maintain a parallel mode upon determining that the steering wheel does not return to the second set angle or less after the rotation angle equal to or greater than the first set angle is applied to the steering wheel.

In yet another embodiment, the independent apparatuses may maintain a parallel mode upon determining that the additional steering input is not applied to the steering wheel after the steering wheel returns to the second set angle or less.

In still yet another embodiment, determining that the vehicle enters the fine steering mode may include performing fine steering of at least one independent steering apparatus located at one end facing the moving direction in response to the additional input to the steering wheel.

In a further embodiment, in performing the rotation of the independent steering apparatuses when the controller receives the parallel mode input, the controller may control the independent steering apparatuses to have a steering angle corresponding to a direction perpendicular to a longitudinal direction of the vehicle.

Other aspects and embodiments of the present disclosure are discussed below.

The above and other features of the present disclosure are discussed below.

BRIEF DESCRIPTION OF THE DRAWINGS

The above and other features of the present disclosure are now described in detail with reference to certain embodiments thereof illustrated in the accompanying drawings which are given hereinbelow by way of illustration only, and thus are not limitative of the present disclosure, and wherein:

FIG. 3 is a flowchart illustrating a method of controlling fine steering of the independent steering apparatuses when driving the independent steering apparatuses in the parallel mode according to one embodiment of the present disclosure.

Figure 1:
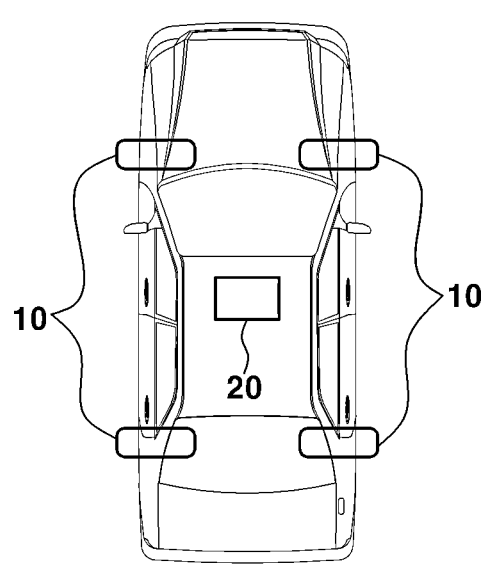
FIG. 1 is a view showing alignment relations among independent steering apparatuses when driving the independent steering apparatuses in a parallel mode according to one embodiment of the present disclosure.

It should be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes, should be determined in part by the particular intended application and use environment.

In the figures, reference numbers refer to the same or equivalent parts of the present disclosure throughout the several figures of the drawing.

DETAILED DESCRIPTION

Hereinafter, reference is made in detail to various embodiments of the present disclosure, examples of which are illustrated in the accompanying drawings and described below. The present disclosure is not limited to the following embodiments, and the embodiments may be implemented in various different forms. The embodiments are provided to make the description of the present disclosure thorough and to fully convey the scope of the present disclosure to those having ordinary skill in the art.

Further, in the following description of the embodiments, it should be understood that the suffixes "part", "unit", "module", etc. indicate units for processing at least one function or operation, and may be implemented as software, hardware, or a combination of software and hardware.

The terminology used herein is for the purpose of describing particular embodiments only and is not intended to be limiting. As used herein, singular expressions may be intended to include plural expressions as well, unless the context clearly indicates otherwise.

A controller 20 which is described below may be implemented through a memory configured to store an algorithm configured to control operations of various elements disposed in a vehicle or data regarding a program for reproducing the algorithm and a processor configured to perform operations which is described below using data stored in the memory. Here, the memory and the processor may be implemented as individual chips. Alternatively, the memory and the processor may be implemented as a single integrated chip. For example, the controller 20 may include at least one of an Electronic Control unit (ECU), a Central Processing unit (CPU), a Micro Processor Unit (MPU), a Micro Controller Unit (MCU), an Application Processor (AP), or an arbitrary type processor which is well known in the field of the present disclosure. Further, the processor 20 may include a combination of software and hardware which are capable of performing calculations in at least one application or program for executing methods according to the embodiments of the present disclosure.

In one embodiment of the present disclosure, independent steering apparatuses 10 are configured to couple respective wheels to a vehicle body, and a steering angle may be independently applied to one independent steering apparatus 10 including one wheel through the controller 20. Further, the independent steering apparatuses 10 according to the present disclosure may be rotated at an angle exceeding 90 degrees from the longitudinal direction of the vehicle.

Further, in the following description of the present disclosure, "a front end" may indicate one end of the front surface of the vehicle based on the moving direction of the vehicle, and "a rear end" may indicate one end of the rear surface of the vehicle based on the moving direction of the vehicle.

In addition, in one embodiment of the present disclosure, "a parallel mode" indicates a state in which the same steering angle is applied to the respective independent steering apparatuses 10 so that the independent steering apparatuses 10 have a designated angle from the longitudinal direction of the vehicle, and, in the following description of the present disclosure, "the parallel mode" indicates a state in which a steering angle is input perpendicularly to the longitudinal direction of the vehicle.

Furthermore, in the present disclosure, "a fine steering mode" indicates a driving mode in which a steering angle is input to the independent steering apparatuses 10 to left or right from the driving direction of the vehicle in the parallel mode.

Hereinafter, reference is made in detail to the embodiments of the present disclosure, examples of which are illustrated in the accompanying drawings and described below. Wherever possible, the same reference numbers are used throughout the drawings to refer to the same or like parts, and a redundant description thereof is omitted.

The present disclosure relates to a method of controlling fine steering of the independent steering apparatuses 10, and more particularly, to a method of controlling fine steering of the independent steering apparatuses 10, each of which is connected to the vehicle body and configured to input a steering angle to a corresponding wheel, when driving the independent steering apparatuses 10 in the parallel mode.

In other words, the controller 20 provides a process of determining whether or not the vehicle enters the parallel mode and determining whether or not a fine steering input is applied when driving the independent steering apparatuses 10 in the parallel mode, so as to provide fine steering to the independent steering apparatuses 100 configured to independently apply a steering angle to each of the wheels when driving the independent steering apparatuses 10 in the parallel mode.

FIG. 1 shows the state in which a steering angle is input to the wheels of the vehicle including the independent steering apparatuses 10 depending on parallel mode input to the vehicle according to one embodiment of the present disclosure.

In one embodiment of the present disclosure, the controller 20 for the independent steering apparatuses 10 receives a vehicle parallel mode driving request through a button located in the vehicle or various methods of receiving a user request. More particularly, the parallel mode input may be received through an AVN button located in the interior of the vehicle, a mode conversion button located in the interior of the vehicle, or a driving mode setting button via a portable device.

In response to the received parallel mode input, the controller 20 may perform control so that the same steering angle is input to the independent steering apparatuses 10 located on the respective wheels of the vehicle. More particularly, the controller 20 applies driving force to the independent steering apparatuses 10 so as to have a designated angle to one side from the longitudinal direction of the vehicle, when the parallel mode input is applied.

In one embodiment of the present disclosure, the controller 20 is configured to control the respective independent steering apparatuses 10 so as to have an angle of 90 degrees from the longitudinal direction of the vehicle in response to the parallel mode input. In other words, the controller 20 is configured to align the wheels in a direction perpendicular to the longitudinal direction of the vehicle in response to the parallel mode input, and also configured to set the moving direction of the vehicle in response to input to a steering wheel 100.

After the parallel mode input, the vehicle travels forwards in the moving direction in response to accelerator pedal input under a driving gear input condition, and the vehicle travels rearwards in the set moving direction when the accelerator pedal input is applied after reverse gear input is applied.

In other words, when driving the vehicle in the parallel mode, the direction of the input to the steering wheel 100 is set to a front side in the moving direction of the vehicle, and the vehicle is accelerated or decelerated in the lateral direction of the vehicle in response to gear input and accelerator pedal/brake pedal input.

Figure 2:
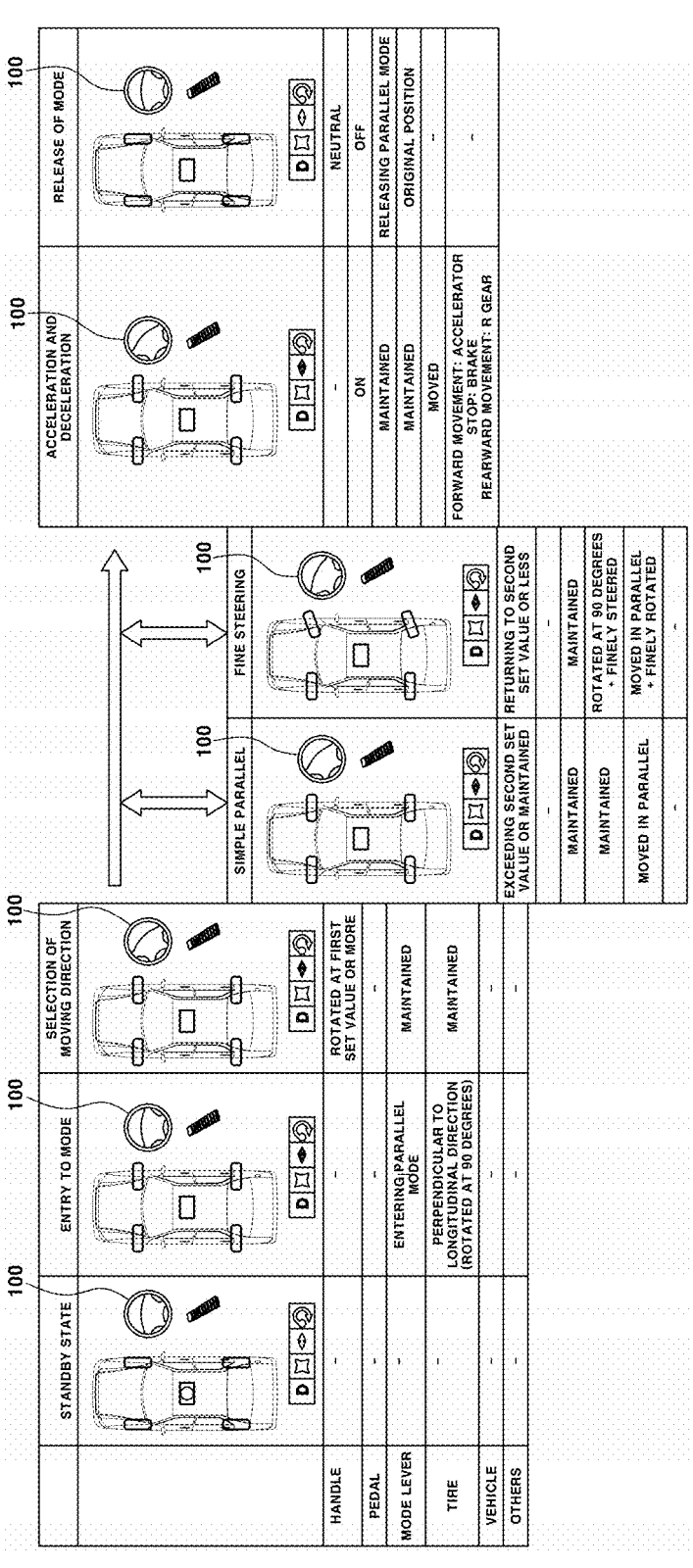
FIG. 2 is a view showing a process of performing fine steering of the independent steering apparatuses when driving the independent steering apparatuses in the parallel mode according to one embodiment of the present disclosure.

FIG. 2 is a view showing the method of controlling fine steering of the independent steering apparatuses 10 according to one embodiment of the present disclosure.

In one embodiment of the present disclosure, modes for the independent steering apparatuses 10 may include the parallel mode, a rotating mode, and a diagonal driving mode. A state in which parallel mode input is applied is further described in the following embodiment.

As shown in this figure, the controller 20 determines whether or not parallel mode input from a user is applied in an initial vehicle standby state, and rotates all the independent steering apparatuses 10 located on the respective wheels in the direction perpendicular to the longitudinal direction of the vehicle, upon determining that the parallel mode input is applied.

The controller 20 may receive the parallel mode input to the vehicle through a parallel mode execution button located in the interior of the vehicle or on a portable device. Further, the controller 20 determines user setting of the moving direction of the vehicle in the parallel mode after application of the parallel mode input. Here, the moving direction of the vehicle when driving the independent steering apparatuses 10 in the parallel mode is set depending on the rotating direction of the steering wheel 100. More particularly, in one embodiment of the present disclosure, the controller 20 determines whether or not the respective wheels 100 are rotated at a first set angle or more, after application of the parallel mode input. For example, the first set angle may be set to 30 degrees to the left or 30 degrees to the right, and the controller 20 may compare the rotation angle of the steering wheel 100 and the set angle stored in the controller 20.

In one example shown in this figure, when the parallel mode input is applied or when the steering wheel 100 is rotated at the angle of 30 degrees or more to the right after application of the parallel mode input, the controller 20 sets the moving direction of the vehicle in the parallel mode to a rightward direction. Therefore, the controller 20 sets the right side of the vehicle to the front side and the left side of the vehicle to the rear side, when accelerator pedal input is applied in response to the parallel mode input.

The controller 20 maintains the driving state of the vehicle in the parallel mode, and accelerates or decelerates the vehicle in the moving direction set depending on the accelerator pedal input, when the steering wheel 100 continues to maintain a state of being rotated at the first set angle or more or the steering wheel 100 maintains a return state (when any additional input to the steering wheel 100 is not applied after the steering wheel 100 has returned to a second set angle or less).

In another embodiment, the controller 20 determines whether or not any additional steering wheel input is applied, when the steering wheel 100 returns to the second set angle or less after the steering wheel 10 is rotated at the first set angle or more, and the controller 20 performs entry of the vehicle into the fine steering mode, upon determining that any additional steering wheel input is applied. Here, the second set angle may be set to 3 degrees to the left or right. In other words, the controller 20 sets the moving direction of the vehicle by determining whether or not the steering wheel 100 is rotated at the first set angle or more in response to the parallel mode input, and thereafter determines the return state of the steering wheel 100. Further, the controller 20 determines whether or not the vehicle enters the fine steering mode by determining whether or not the steering wheel 100 is additionally rotated after the steering wheel 100 is returned to the second angle or less.

Thereafter, in the state in which the independent steering apparatuses 10 are converted to be perpendicular to the longitudinal direction of the vehicle depending on the parallel mode, the controller 20 controls the independent steering apparatuses 10 located at the front side in the moving direction of the vehicle to perform fine steering in the fine steering mode. In one embodiment of the present disclosure, when the moving direction of the vehicle in the parallel mode is set to the rightward direction of the vehicle, the controller 20 controls the independent steering apparatuses 10 located at the right side of the vehicle so that the steering angle of the corresponding independent steering apparatuses 10 is changed in response to the fine steering input to the vehicle.

In one embodiment of the present disclosure, when the vehicle enters the fine steering mode, the steering angles of the front steering apparatus 10 and the rear steering apparatus 10 located at the right side of the vehicle are controlled in response to the input to the steering wheel 100. Further, when the input to the steering wheel 100 corresponds to the rightward direction, fine steering may be performed rightwards based on the moving direction of the right side of the vehicle moving depending on driving in the parallel mode. In addition, when the input to the steering wheel 100 corresponds to the leftward direction, fine steering may be performed leftwards based on the moving direction of the right side of the vehicle moving depending on driving in the parallel mode. Here, fine steering of the independent steering apparatuses 10 may be performed in the same direction as the rotating direction of the steering wheel 100 based on the moving direction depending on the input to the steering wheel 100 which performs fine steering, or may be performed in response to input in the opposite direction. Further, the independent steering apparatuses 10 located at the front side in the moving direction perform fine steering leftwards or rightwards based on the longitudinal direction of the wheels depending on the parallel mode, in response to the direction of the input to the steering wheel 10.

In performing the driving of the independent steering apparatuses 10 in the parallel mode, the controller 20 determines whether or not the steering wheel 100 returns to an original position thereof and whether or not any additional input to the steering wheel 100 is applied after the return of the steering wheel 100, and performs fine steering of the independent steering apparatuses 10 located at the front side in the moving direction of the vehicle in the parallel mode.

As such, in the present disclosure, the vehicle is moved in the lateral direction and the independent steering apparatuses 10 located at the front end in the moving direction of the vehicle perform fine steering, simultaneously, in the parallel mode, and thereby, the lateral moving direction of the vehicle may be more precisely controlled.

FIG. 3 is a flowchart representing a method of controlling fine steering of the independent steering apparatuses 10 according to one embodiment of the present disclosure.

As shown in this figure, the method includes determining, by the controller 20, whether or not parallel mode input is applied to the vehicle for the first time (in an operation S10).

The controller 20 receives the parallel mode input through operation of the button located in the interior of the vehicle, operation of the AVN button located in the interior of the vehicle, or driving input using a smartphone. The controller 20 receives the parallel mode input through various operations, and performs input of a steering angle to the independent steering apparatuses 10 (in an operation S20).

Further, in addition to performing the steering angle input to the independent steering apparatuses 10 in the direction perpendicular to the longitudinal direction of the vehicle in response to the parallel mode input, the controllers sets the moving direction of the vehicle in the parallel mode (in the operation S20).

According to one embodiment of the present disclosure, in setting the moving direction of the vehicle in the parallel mode, the controller 20 compares the steering input (e.g., a rotation angle) to the steering wheel 100 with the first set angle. In other words, upon determining that the steering wheel 100 is rotated to left or right at the first set angle or more, the controller 20 sets the moving direction of the vehicle in the parallel mode to one of left and right to which the steering wheel is rotated (S20).

As such, the controller 20 determines whether or not the parallel mode input is applied, and measures the rotating direction and rotation angle of the steering wheel 100 so as to set the front side and the rear side in the moving direction of the vehicle in the parallel mode in response to the parallel mode input. Further, when the steering wheel 100 is rotated at the first set angle or more in one direction, the moving direction of the vehicle in the parallel mode is set to the direction in which the steering wheel is rotated (in operation S20).

The controller 20 determines whether or not accelerator pedal input is applied after setting the moving direction, and drives the respective wheels so that the vehicle is moved laterally in the set moving direction in response to a depth to which the accelerator pedal is depressed. After setting the moving direction of the vehicle, when a reverse gear is input, the controller may set the opposite direction to the set moving direction to a reverse direction. Further, the controller 20 may decelerate the vehicle traveling in the moving direction or rearwards in the moving direction in response to brake pedal input. In other words, the vehicle is controlled to be accelerated towards the side set as the moving direction when a driving gear is input, and to be accelerated towards the opposite side to the side set as the moving direction when the reverse gear is input, in response to accelerator input in the parallel mode.

Thereafter, the controller 20 determines whether or not the vehicle enters the fine steering mode by determining whether or not the steering wheel 100 rotated at the first set angle or more returns to the second set angle or less, and by determining whether or not any additional input is applied to the steering wheel 10 after returning the steering wheel 100 to the second set angle or less (in an operation S30).

In other words, in determining fine steering mode input, the controller 20 determines whether or not the steering wheel 100 returns to the second set angle or less depending on setting of the moving direction of the vehicle in the parallel mode, and performs fine steering of the independent steering apparatuses 10 located at the front end in the moving direction of the vehicle in response to the additional input to the steering wheel 100 (in an operation S40).

For example, after the moving direction of the vehicle in the parallel mode has been set to the rightward direction of the vehicle, when additional input is applied to the steering wheel 100 in the rightward direction in the fine steering mode, an additional steering angle is input to the independent steering apparatuses 10 located at the front and rear parts of the right side of the vehicle so as to provide a turning environment rightward in the moving direction of the vehicle in the parallel mode (in the operation S40).

On the contrary, after the moving direction of the vehicle in the parallel mode has been set to the rightward direction of the vehicle, when additional input is applied to the steering wheel 100 in the leftward direction in the fine steering mode, an additional steering angle is input to the independent steering apparatuses 10 located at the front and rear parts of the right side of the vehicle so as to provide a turning environment leftward in the moving direction of the vehicle in the parallel mode (in the operation S40).

However, the rotating direction of the steering wheel 100 in the fine steering mode of the present disclosure is not limited to the disclosed embodiment, and a fine steering angle may be input to the independent steering apparatuses 10 at the front side in the moving direction set in the parallel mode in response to various types of rotation.

Figure 4:
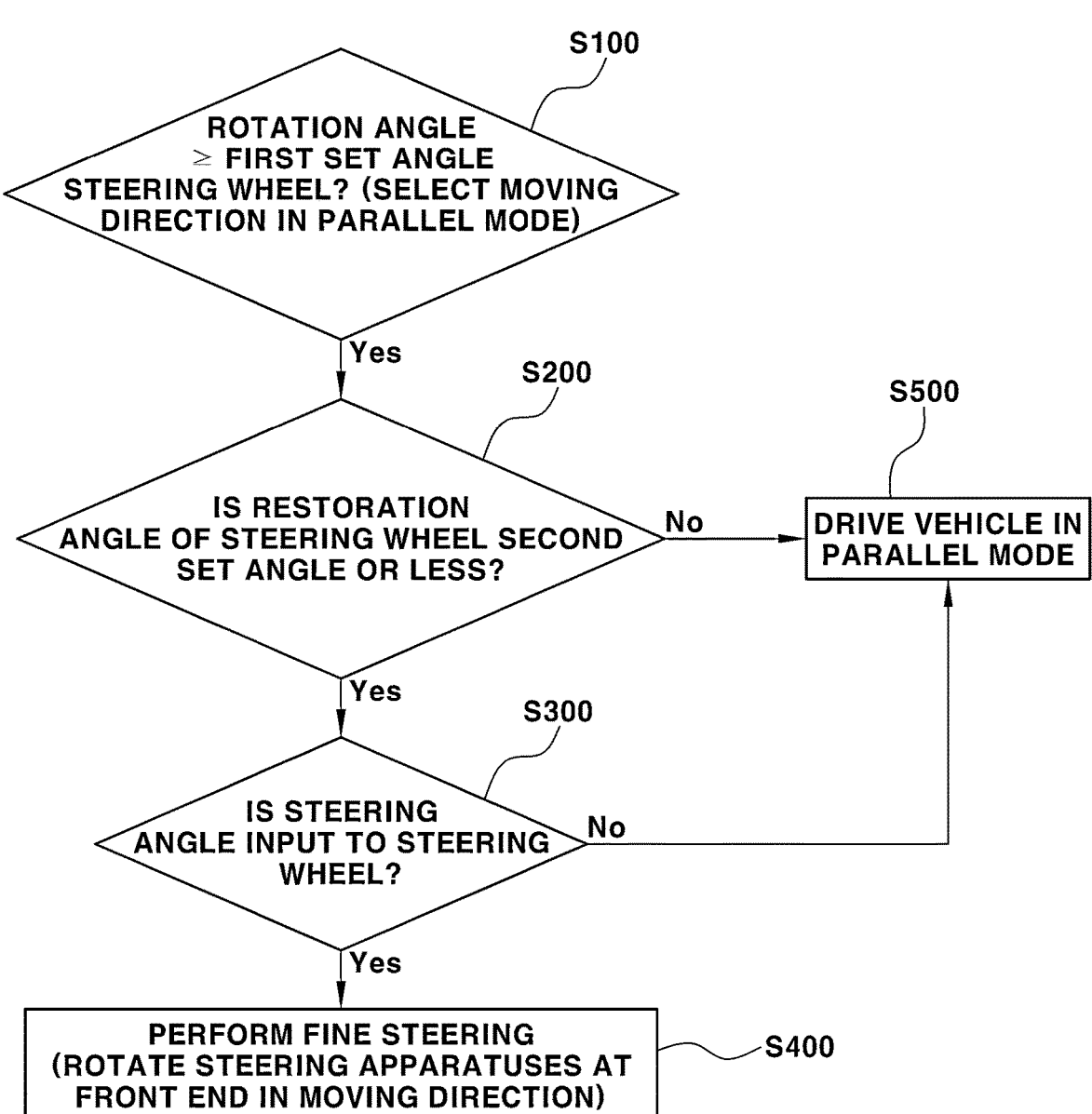
FIG. 4 is a flowchart illustrating a method of determining whether or not the vehicle enters a fine steering mode of the independent steering apparatuses when driving the independent steering apparatuses in the parallel mode according to one embodiment of the present disclosure.

FIG. 4 is a flowchart representing a method of determining whether or not the vehicle enters the fine steering mode according to one embodiment of the present disclosure.

In one embodiment of the present disclosure, the controller 20 determines that the moving direction is set, upon determining that the steering input (e.g., a rotation angle) to the steering wheel 100 corresponds to the first set angle or more (in an operation S100), and determines whether or not the steering wheel 100 of the vehicle, the moving direction of which has been set, returns to the second set angle or less (in an operation S200).

Upon determining that the steering wheel 100 does not return to the second set angle or less when the moving direction of the vehicle in the parallel mode is set through the steering wheel 100 having the steering input corresponding to the first set angle or more, the vehicle maintains driving in the parallel mode (in an operation S500).

On the other hand, after returning the steering wheel 100 of the vehicle, the moving direction of which has been set, to the second set angle or less, the controller 20 determines whether or not additional rotating angle input is applied to the steering wheel 200 (in an operation S300).

Upon determining that additional rotating angle input is applied to the steering wheel 200, the controller 20 performs fine steering of the independent steering apparatuses 10 located at the front end in the moving direction of the vehicle in the parallel mode (in an operation S400). Upon determining that additional rotating angle input is not applied to the steering wheel 200, the controller 20 stores the moving direction of the vehicle in the parallel mode, and maintain the parallel mode and driving environment along the stored moving direction (in an operation S500).

In other words, the controller 20 determines fine steering mode input based on whether or not the steering wheel 100 is rotated at the first set angle or more and then returns to the second set angle or less, and performs driving of the vehicle in the fine steering mode upon determining that additional rotating angle input is applied to the returned steering wheel 10.

On the contrary, the controller 20 maintains driving in the parallel mode upon determining that the steering wheel 100 rotated at the first set angle or more does not return to the second set angle or less, or upon determining that additional steering angle input is not applied to the steering wheel 100 after returning the steering wheel 100 to the second set angle or less.

As such, the controller 20 is configured to execute the fine steering mode through the steering angle input to the independent steering apparatuses 10 located at the front end in the moving direction, when, as conditions for determining whether or not the vehicle enters the fine steering mode, i.e., all of a condition for returning the steering wheel 100 to the second set angle or less and a condition for applying additional rotating angle input to the steering wheel 100 after setting the moving direction of the vehicle in the parallel mode, are satisfied.

As is apparent from the above description, the present disclosure may provide the following effects through the above-described configuration and connection and usage relations.

The present disclosure provides technology for measuring sequential steering wheel inputs and, in response, and performing fine steering of steering apparatuses, thereby being capable of providing excellent steering performance to a user.

Further, in the present disclosure, a controller configured to measure the steering wheel inputs determines parallel mode input and fine steering mode input, thereby being capable of providing a fine steering mode in which user convenience is increased.

The present disclosure has been described in detail with reference to some embodiments thereof. However, it should be appreciated by those having ordinary skill in the art that changes may be made in these embodiments without departing from the principles and spirit of the present disclosure, the scope of which is defined in the appended claims and their equivalents.

What is claimed is:

1. A method of controlling fine steering of independent steering apparatuses for a vehicle, comprising:

determining, by a controller, a parallel mode input;

performing rotation of the independent steering apparatuses when the controller receives the parallel mode input;

determining, by the controller, a moving direction of the vehicle in response to a rotating direction of a steering wheel;

after setting the moving direction of the vehicle, determining, by the controller, whether the vehicle enters a fine steering mode; and performing, by the controller, steering angle input to the independent steering apparatuses located at a front end in the moving direction of the vehicle.

2. The method of claim 1, wherein, determining the moving direction of the vehicle comprises:

determining whether a rotation angle equal to or greater than a first set angle is applied to the steering wheel.

3. The method of claim 2, wherein determining whether the vehicle enters the fine steering mode comprises:

after the rotation angle equal to or greater than the first set angle is applied to the steering wheel, determining whether the steering wheel returns to a second set angle or less; and when an additional steering input is applied to the steering wheel after the steering wheel returns to the second set angle or less, determining that the vehicle enters the fine steering mode.

4. The method of claim 3, wherein upon determining that the steering wheel does not return to the second set angle or less after the rotation angle equal to or greater than the first set angle is applied to the steering wheel, the independent apparatuses maintain a parallel mode.

5. The method of claim 3, wherein upon determining that the additional steering input is not applied to the steering wheel after the steering wheel returns to the second set angle or less, the independent apparatuses maintain a parallel mode.

6. The method of claim 3, wherein determining that the vehicle enters the fine steering mode comprises:

performing fine steering of at least one independent steering apparatus, among the independent steering apparatuses, located at one end facing the moving direction in response to additional input to the steering wheel.

7. The method of claim 1, wherein, in performing the rotation of the independent steering apparatuses when the controller receives the parallel mode input, the controller controls the independent steering apparatuses to have a steering angle corresponding to a direction perpendicular to a longitudinal direction of the vehicle.

8. A method of controlling fine steering of independent steering apparatuses, comprising:

determining, by a controller, a parallel mode input;

performing rotation of the independent steering apparatuses of a vehicle when the controller receives the parallel mode input;

determining, by the controller, a moving direction of the vehicle in response to a rotating direction of a steering wheel of the vehicle;

after setting the moving direction of the vehicle, determining, by the controller, whether the vehicle enters a fine steering mode;

determining, by the controller, whether an additional input is applied to the steering wheel upon determining that the vehicle enters the fine steering mode; and after the vehicle enters the fine steering mode, performing, by the controller, steering angle input to the independent steering apparatuses located at a front end in the moving direction of the vehicle in response to the additional input to the independent steering wheel.

9. The method of claim 8, wherein determining the moving direction of the vehicle comprises:

determining whether a rotation angle equal to or greater than a first set angle is applied to the steering wheel.

10. The method of claim 9, wherein determining whether the vehicle enters the fine steering mode comprises:

after the rotation angle equal to or greater than the first set angle is applied to the steering wheel, determining whether the steering wheel returns to a second set angle or less; and when an additional steering input is applied to the steering wheel after the steering wheel returns to the second set angle or less, determining that the vehicle enters the fine steering mode.

11. The method of claim 10, wherein upon determining that the steering wheel does not return to the second set angle or less after the rotation angle equal to or greater than the first set angle is applied to the steering wheel, the independent apparatuses maintain a parallel mode.

12. The method of claim 10, wherein upon determining that the additional steering input is not applied to the steering wheel after the steering wheel returns to the second set angle or less, the independent apparatuses maintain a parallel mode.

13. The method of claim 10, wherein determining that the vehicle enters the fine steering mode comprises:

performing fine steering of at least one independent steering apparatus, among the independent steering apparatuses, located at one end facing the moving direction in response to the additional input to the steering wheel.

14. The method of claim 8, wherein, in performing the rotation of the independent steering apparatuses when the controller receives the parallel mode input, the controller controls the independent steering apparatuses to have a steering angle corresponding to a direction perpendicular to a longitudinal direction of the vehicle.

\* \* \* \* \*